United States Patent [19]
West et al.

[11] 3,718,703
[45] Feb. 27, 1973

[54] BISORGANOALKALINE EARTH METAL COMPOUNDS AND A METHOD OF PREPARING SAME FROM BISORGANOMERCURIALS

[75] Inventors: Peter West, Wellesley; Mary C. Woodville, Cambridge, both of Mass.

[73] Assignee: The Dow Chemical Company, Midland, Mich.

[22] Filed: July 2, 1970

[21] Appl. No.: 52,082

[52] U.S. Cl..............260/665 R, 260/82.1, 260/879, 260/885, 260/887, 260/896
[51] Int. Cl................................C07f 3/00, C07f 3/04
[58] Field of Search...............260/665, 665 G, 665 R

[56] References Cited

UNITED STATES PATENTS

| | | | |
|---|---|---|---|
| 2,835,712 | 5/1958 | Ziegler et al. | 260/665 |
| 3,234,251 | 2/1966 | Garty et al. | 260/429.9 |
| 3,277,182 | 10/1966 | Pampus et al. | 260/612 |
| 3,297,756 | 1/1967 | Benson et al. | 260/567.6 |

OTHER PUBLICATIONS

Balueva et al., Russian Chemical Reviews 31 (1962) p. 447–451.

Kaufman, Handbook of Organometallic Compounds; D. VanNostrand Co., Inc. New York, N.Y., p. 33, 31.
Utke et al., J. Org. Chem. 28(1963) p. 3582–3584.
Gilman et al., J. Am. Chem. Soc. 67(1945) p. 520.
Payne et al., J. Am. Chem. Soc. 80 (1958) p. 5324.
Fischer et al., Chem. Abstracts 55(1961) Column 25788e.
Vaughn et al., Chem. Abstracts 30(1936) Column 429.
Nesmeyanov et al., Methods of Elemento Organic Chemistry, Vol. 2, 1967, North Holland Publishing Co., Amsterdam p. 679–680.

*Primary Examiner*—H. Sneed
*Attorney*—Griswold and Burdick and C. E. Rehberg

[57] ABSTRACT

Novel bisorganoalkaline earth metal compounds are prepared by reacting bisorganomercurials with calcium, strontium or barium. The novel process is conducted in a solvent. As an example, dibenzylcalcium is prepared by reacting dibenzylmercury with calcium in tetrahydrofuran. The bisorganoalkaline earth metal compounds are useful as metallating reagents in organic synthesis and as initiators in the polymerization of vinyl monomers, such as styrene and butadiene.

23 Claims, No Drawings

BISORGANOALKALINE EARTH METAL COMPOUNDS AND A METHOD OF PREPARING SAME FROM BISORGANOMERCURIALS

BACKGROUND OF THE INVENTION

As used herein, the term "alkaline earth metal" shall mean calcium (Ca), strontium (Sr) and barium (Ba) exclusively.

The bisorganoalkaline earth metal compounds are little known, particularly in a pure state. The prior art compounds were usually obtained in the form of an unresolved complex with either another organometallic compound, e.g. $SrZn(C_2H_5)_4$, or with an amine, such as ammonia. The state of the art is illustrated, for example, in (1) Russian Chemical Reviews, English translation, Vol. 31, No. 8 (Aug., 1962), pp. 447–451; and (2) "Handbook of Organometallic Compounds" by N. Hagihara, M. Kumada and R. Okawara, Benjamin, N. Y. (1968), pp. 35–62. Other references of interest are (3) "Advances in Inorganic Chemistry and Radiochemistry," edited by H. J. Emeleus and A. G. Sharpe, Vol. 11, Academic Press, N. Y. (1968), p. 341 et seq. (particularly pp. 342, 343, 350 and 370); (4) "Organometallic Compounds," by G. E. Coates, M. L. H. Green and K. Wade, Vol. I, 3rd Ed., Methuen & Co. Ltd., London (1967), pp. 73–76; and (5) F. Schulze, Iowa State College J. Sci., 8, 225 (1933). The latter reference specifically states that he obtained no formation of bisorganocalcium compounds when calcium was heated with the diethyl, di-n-butyl, diphenyl and di-p-tolyl derivatives of mercury in a sealed tube. Until now there has not been any process for preparing essentially pure bisorganoalkaline earth metal compounds, except for the dicyclopentadienyl derivatives of calcium, strontium and barium, and the bis(4,4-difluoro-3-buten-1-ynyl) derivatives of calcium and barium.

SUMMARY OF THE INVENTION

It has now been discovered that both novel and known bisorganoalkaline earth metal compounds having the formula R-M-R (I), wherein each R is, independently, hydrocarbyl or inertly-substituted hydrocarbyl radicals and M is calcium, strontium or barium, are prepared in excellent yields and purity in the novel process described herein. The process comprises reacting by contacting in solution (a) a bisorganomercury compound of the formula R—Hg—R (II), wherein R has the aforesaid meaning, with (b) calcium, strontium, or barium. The bisorganoalkaline earth metal compounds are useful as metallating reagents and as initiators for the polymerization of polymerizable vinyl monomers, such as styrene, butadiene, isoprene, etc.

Surprisingly, the order of reactivity of the metals in the process varies inversely with respect to the relative ionization potentials of the metals.

The subject novel bisorganoalkaline earth metal compounds are represented by the formula R–M–R (I), wherein each R is, independently, alkyl, such as methyl, ethyl, isopropyl, hexyl, octyl, dodecyl, octadecyl, and the like; aryl, such as phenyl, naphthyl, indenyl, and the like; alkaryl, such as o-, m- or p-tolyl, 3,5-dimethylphenyl, p-t-butylphenyl, p-octylphenyl, p-dodecylphenyl, and the like; aralkyl, such as benzyl, phenethyl, 2-phenylpropyl, 6-phenylhexyl, p-methylphenethyl, p-t-amylbenzyl and the like; alkenyl, such as vinyl, allyl, 3-butenyl, 4-hexenyl, and the like; cycloalkyl, such as cyclopropyl, cyclohexyl, and the like; cycloalkenyl, such as cyclohexenyl, indenyl, and the like; alkyl- or aryl-substituted alkynyl, such as phenylethynyl, 1-pentynyl, 1-octynyl, and the like; heterocyclics, such as vinylcarboranyl, 3-pyridyl, 2-furyl, 2-thienyl, ferrocenyl, and the like; or an alkoxy- or aryloxy-substituted alkyl, aryl, alkaryl, aralkyl, alkenyl, cycloalkyl or cycloalkenyl group, such as methoxymethyl, ethoxypropyl, methoxyphenyl, butoxybenzyl, decyloxycyclohexyl, 3-ethoxycyclohexenyl, 4-phenoxybutyl, 4-phenoxyphenyl, etc. Each R is an organic moiety, as defined above, having from one to about 25 carbon atoms, or more. Preferred compounds are those in (I) wherein each R is the same, and R is alkyl, aryl, alkaryl, aralkyl, alkenyl, cycloalkenyl, cycloalkyl or heterocyclic groups of from one to about 10 carbon atoms; the conjugate acid (R—H) of the preferred compounds each have a pKa greater than triphenylmethane, i.e. greater than about 32 in accordance with the method set forth by A. Streitwieser, Jr., et al., J. Am. Chem. Soc., 89, 63 (1967). The most preferred compounds are those in (I) wherein each R is the same, and R is alkyl of from 1 to 4 carbon atoms, phenyl, benzyl, p-t-amylbenzyl, vinyl, allyl, cyclopropyl, cyclohexenyl, indenyl or phenylethynyl. The subject compounds are typically white or pale yellow solids which degrade in the presence of water and/or oxygen.

The subject process comprises reacting by contacting in solution a bisorganomercury compound having the formula (II) with an alkaline earth metal. Based on commercial availability and ease of product purification, each R in (II) is preferably an identical hydrocarbyl or inertly substituted hydrocarbyl radical, as defined above. The subject compounds are prepared by selecting the appropriate bisorganomercury reactant. Unsymmetric compounds, i.e. those in (I) wherein the R groups are different, are prepared by using either a mixture of bisorganomercury reactants, e.g. $R_1$—Hg—$R_1$ and $R_2$—Hg—$R_2$, or by using an unsymmetrical bisorganomercury reactant.

Illustrative examples of suitable such bisorganomercury compounds include dialkylmercurials, such as dimethylmercury, diethylmercury, di-i-propyl-mercury, di-n-butylmercury, dihexylmercury, and the like; diarylmercurials such as diphenylmercury, bis($\beta$-naphthyl)mercury, and the like; dialkarylmercurials, such as bis(tolyl)mercury, bis(p-t-butylphenyl) mercury, bis(3,5-diethylphenyl)mercury, and the like; bis(aralkyl)-mercurials, such as dibenzylmercury, bis(phenethyl)mercury, and the like; bis(alkenyl)mercurials, such as bis(vinyl)-mercury, bis(allyl)mercury, and the like; bis(cycloalkyl)-mercorials, such as bis(cyclopropyl)mercury, bis(cyclohexyl)mercury, and the like; bis(cycloalkenyl) and bis(cycloalkadienyl)mercurials, such as bis(cyclohexenyl)-mercury, bis(cyclopentadienyl)mercury, bis(indenyl)mercury, and the like; bis(alkynyl)mercurials, such as bis(ethynyl)-mercury, bis(phenylethynyl)mercury, and the like; and unsymmetrical mercury compounds, such as methylbenzylmercury, (phenylethynyl)phenylmercury, etc.

The alkaline earth metals may be suitably used in any one of several forms. Such forms include elemental metal, amalgams, alloys, e.g. alloys with lithium, magnesium, sodium, etc. (such alloys typically having only minor amounts of lithium, magnesium, etc.) Also, the alkaline earth metals may be used in the form of small pieces or chunks, shavings, filings, fine dispersions, etc. The reaction rate increases with increased surface area of the metal at any given temperature. Adequate agitation also facilitates the reaction.

The process is conducted in solution, i.e. the bisorganomercury and/or alkaline earth metal reactants are dissolved in a suitable inert solvent prior to or during the course of the reaction. By inert, we mean inert in the process. Typically, compounds which are inert solvents for the bisorganomercury reactant(s) are not solvents for the alkaline earth metals. Hence, the reaction mixture is preferably stirred or otherwise agitated to maintain intimate contact of the reactants. Suitable such inert solvents are liquids and include aliphatic ethers and polyethers, such as diethyl ether, ethyl propyl ether, 1,2-dimethoxyethane, diethylene glycol dimethyl or diethyl ether, and the like; cyclo-aliphatic ethers and polyethers, such as tetrahydrofuran (THF), p-dioxane, and the like; tertiary amines, such as N,N,N',N'-tetramethylethylenediamine, hexamethylphosphoramide and the like; and mixtures thereof. THF is the preferred solvent. In some instances, a mixture of one or more of the above solvents with a liquid hydrocarbon, such as hexane, cyclohexane, benzene, toluene, xylene, etc., may be advantageous. Since the products and alkaline earth metals are reactive with compounds bearing active hydrogen, such as water, alcohols, mercaptans, etc., it is advantageous to use solvents which are substantially free of such reactive contaminants and to conduct the process under substantially anhydrous conditions.

The reaction temperature is suitably about $-70°$ C. to about 70° C., but is preferably about $-10°$ C. to about 30° C. At temperatures above about 70° C., the reaction occurs but the product yield may be lowered as a result of competing side reactions. At temperatures below about $-70°$ C., the reaction rate is too low to be commercially feasible.

The atmosphere above the reaction is not critical so long as it is essentially inert.

The stoichiometry of the process requires one mole of alkaline earth metal per mole of bisorganomercury reactant. However, an excess of alkaline earth metal is generally preferred to assure complete reaction.

The reactants should be maintained in contact until the desired product is formed. Generally, a reaction time of from about 15 minutes to about 8 hours is sufficient for the reaction to be substantially complete and a reaction time of from 30 minutes to about 3 hours is sufficient for the majority of the reactions.

The subject compounds are useful as novel polymerization initiators in the polymerization of vinyl monomers, such as styrene; butadiene; isoprene; acrylics, such as methyl methacrylate, etc. The compounds are typically used in small but initiating amounts in the polymerizations which proceed under conventional polymerization process conditions.

SPECIFIC EMBODIMENTS

The following examples further illustrate the invention:

EXAMPLES 1-20

In these examples, the following general procedure was used.

The alkaline earth metal (in the form of small chips or finely divided particles) and a dry, freshly distilled solvent were charged to a reaction vessel having an essentially anhydrous, inert atmosphere (dry argon). The mercury reactant was then added to the stirred (generally pre-cooled) heterogeneous mixture and the resulting reaction mixture stirred for a designated period of time during which light was excluded from the system. The reaction mixture was centrifuged and the supernatant liquid (A) was separated from any solid (B). Typically, the product was soluble in the reaction solvent and was analyzed as a solution, (A); a dry product was then obtained from (A) by removing the solvent under reduced pressure. In those instances where the product was an insoluble solid, included in (B) as a separate layer, it was separated from the partially amalgamated alkaline earth metal, washed with solvent, dried under vacuum and analyzed.

In those instances where the bisorganomercury reactant was a solid, the above procedure was altered to the extent that the solvent (generally pre-cooled) was added with agitation to a mixture of the alkaline earth metal and bisorganomercury reactants.

Finely divided particles of the alkaline earth metals were prepared by (a) passing a slurry of silicone oil and alkaline earth metal chips through a shear blender, (b) draining off the oil, (c) washing the metal with dry benzene, (d) draining off the benzene and removing the residual benzene under reduced pressure.

The products were analyzed and their structures confirmed by one or more of the following analytical techniques: 100 $MH_z$ proton magnetic resonance (PMR), electronic (ultraviolet and visible), infrared (IR) and mass spectrographic methods. The chemical shifts ($\delta$, ppm) of resonance absorption patterns are given with respect to tetramethylsilane as an internal standard. The electronic absorption data ($\lambda$(max)) were obtained on solutions of the compounds in THF at ambient temperature. The IR data were obtained on the products in a purified mineral oil mull ("Nujol"). Approximate band centers are given with an indication of relative intensities; (vs) very strong, (s) strong, (m) medium and (w) weak.

The "percent yield" in Table I is based on 100 percent conversion of mercury reactant for all examples except 3 and 5 which were 45 percent and 95 percent conversion, respectively. Also, under the column "Reaction Temp., ° C.," there are occasionally two or more temperatures cited. In those instances, the temperature and the associated time are to be read sequentially, e.g. In Example 1, the temperature was maintained at 0°-10° C. for 2 hours and then raised to 10°-23 C. for 2 hours.

TABLE I

| Example number | Mercury reactant | Metal | Product | Reaction temp., °C. | Reaction time, hrs. | THF, ml. | Percent yield |
|---|---|---|---|---|---|---|---|
| 1 | Diallyl Hg (0.5 ml., 3.7 mmoles) | Ca (0.81 g.) | Diallyl Ca | 0–10 / 10–23 | 2.0 / 2.0 | 5.0 | 95 |
| 2 | Diallyl Hg (0.25 ml., 1.9 mmoles) | Sr (molar excess) | Diallyl Sr | 0 | 1.5 | 7.0 | [1] 100 |
| 3 | Diallyl Hg (0.25 ml., 1.9 mmoles) | Ba (molar excess) | Diallyl Ba | −8 | 3.5 | 5.0 | 95 |
| 4 | Dibenzyl Hg (1.42 g., 3.7 mmoles) | Ca (0.81 g.) | Dibenzyl Ca | 0 / 0–23 | 4.0 / 2.0 | 6.0 | 96 |
| 5 | Dibenzyl Hg (0.93 g., 2.4 mmoles) | Sr (molar excess) | Dibenzyl Sr | 23 / 0 | 0.5 / 2.0 | 5.0 | 85 |
| 6 | Dibenzyl Hg (1.07 g., 2.8 mmoles) | Ba (molar excess) | Dibenzyl Ba | 23 / 0 | 0.5 / 4.0 | 5.0 | 97 |
| 7 | Bis(p-t-amylbenzyl) Hg (0.24 g., 0.45 mmoles) | Ca (0.4 g.) | Bis (p-t-amylbenzyl) Ca | 23 | 2.5 | 1.5 | 78 |
| 8 | Bis (p-t-amylbenzyl) Hg (0.21 g., 0.4 mmoles) | Sr (molar excess) | Bis (p-t-amylbenzyl) Sr | −10 to 0 | 2.0 | 2.0 | 92 |
| 9 | Bis (p-t-amylbenzyl) Hg (0.21 g., 0.4 mmoles) | Ba (molar excess) | Bis (p-t-amylbenzyl) Ba | −10 to 0 | 3.5 | 2.0 | 82 |
| 10 | Bis(cyclopentadienyl) Hg (0.53 g., 1.6 mmoles) | Ca (molar excess) | Bis (cyclopentadienyl) Ca | −8 / 0 / 23 | 0.5 / 0.5 / 0.25 | 3.0 | [1] 100 |
| 11 | Bis(cyclopentadienyl) Hg (0.58 g., 1.7 mmoles) | Sr (molar excess) | Bis (cyclopentadienyl) Sr | −12 | 2.5 | 4.0 | [1] 100 |
| 12 | Bis (indenyl) Hg (0.84 g., 1.6 mmoles) | Ca (molar excess) | Bis (indenyl) Ca | −10 | 3.0 | 4.0 | [1] 100 |
| 13 | Bis (indenyl)Hg (0.21 g., 0.4 mmoles) | Sr (molar excess) | Bis (indenyl) Sr | −10 | 3.0 | 4.0 | [1] 100 |
| 14 | Bis (phenylethynyl) Hg (0.85 g., 2.1 mmoles) | Ca (molar excess) | Bis (phenylethynyl) Ca | 0–10 / 10–23 | 2.5 / 1.0 | 4.0 | [1] 100 |
| 15 | Bis (phenylethynyl) Hg (0.51 g., 1.3 mmoles) | Sr (molar excess) | Bis (phenylethynyl) Sr | 23 | 3.4 | 4.0 | [1] 100 |
| 16 | Bis (phenylethynyl) Hg (0.52 g., 1.3 mmoles) | Ba (molar excess) | Bis (phenylethynyl) Ba | −8 | 2.5 | 4.0 | [1] 100 |
| 17 | Bis (vinylcarboranyl) Hg (0.64 g., 1.2 mmoles) | Car (molar excess) | Bis(vinylcarboranyl)Ca | −10 / −10–0 / 0 | 0.5 / 2.5 / 0.5 | 3.5 | [1] 100 |
| 18 | Diphenyl Hg (1.44 g., 4.1 mmoles) | Ca (molar excess) | Diphenyl Ca | 0–23 / 23 | 3.0 / 2.5 | 5.0 | 97 |
| 19 | Diphenyl Hg (0.82 g., 2.3 mmoles) | Sr (molar excess) | Diphenyl Sr | 23 / 0 | 3.0 / 0.5 | 5.0 | 68 |
| 20 | Diphenyl Hg (0.83 g., 2.3 mmoles) | Ba (molar excess) | Diphenyl Ba | 0 | 2.0 | 5.0 | 98 |

[1] Ca (calcium).

PRODUCT DESCRIPTION AND GENERAL COMMENTS

Example 1. Product obtained as a clear, yellow solution in THF. Dry product was a white pyrophoric powder which was insoluble in diethyl ether; slightly soluble in 1,2-dimethoxyethane and soluble in THF. The solubility in THF varied inversely with the temperature. $\lambda$(max) at 301 m$\mu$. PMR analysis of a 0.6 M solution in THF at 30° C. showed a quintet at $\delta = 6.28$ and a doublet at $\delta = 2.32$. IR absorption at 3065 (w), 1555 (s), 1535 (s), 1257 (s), 1020 (vs), 624 (s) and 540 (s) cm$^{-1}$.

Example 2. Product obtained as a white precipitate. IR absorption at 3065 (w), 1545 (m), 1530 (m), 1415 (w), 1230 (s), 1035 (s) and 610 (vs) cm$^{-1}$.

Example 3. Product obtained as a yellow-green solid which was insoluble in THF at −8° C. Propylene was observed as a by-product. IR absorption at 1539 (s), 1228 (m), 1003 (m) and 622 (s) cm$^{-1}$.

Example 4. Product obtained as a clear, yellow-orange solution in THF. Dry product was a yellow-orange solid which was soluble in THF and in a 10% − N,N,N′,N-tetramethylethylenediamine−90% THF mixture. The dry product reacted with 1,2-dimethoxyethane to produce methyl vinyl ether. $\lambda$max at 323 m$\mu$. PMR analysis of a 0.6 M solution in THF at 30° C. showed a triplet at $\delta = 6.45$, a doublet at $\delta = 6.35$, a triplet at $\delta = 5.75$ and a singlet at $\delta = 1.50$. IR absorption at 1570 (s), 1283 (s), 1243 (m), 1173 (s), 982 (m), 855 (m), 747 (s), 690 (vs) and 540 (m) cm$^{-1}$. By-products were dibenzyl and toluene.

Example 5. Product was partially soluble in THF and was obtained both as a clear, orange supernatant liquid (ca. 0.25 M in THF) and as a yellow precipitate. Lower reaction temperatures increase the product yield at the expense of dibenzyl and toluene by-products. $\lambda$(max) at 333 m$\mu$. PMR analysis on a 0.25 M solution in THF at 30° C. showed a triplet at $\delta = 6.51$, a doublet at $\delta = 6.23$ and a triplet at $\delta = 5.68$.

Example 6. Product was partially soluble in THF and was obtained as a clear, orange supernatant liquid (Ca. 0.07 M in THF) and as yellow precipitate. PMR analysis of the supernatant liquid at 0° C. showed a triplet at $\delta = 6.41$, a doublet at $\delta = 5.76$ and a triplet at $\delta = 5.36$.

Example 7. Product obtained as a clear, yellow-orange solution in THF. The by-product was p-t-amyltoluene. Product yield is increased by lowering the reaction temperature. $\lambda$(max) at 323 m$\mu$. PMR analysis of a 0.2 M solution in THF at 30° C. showed a doublet at $\delta = 6.52$, a doublet at $\delta = 6.30$, a singlet at $\delta = 1.40$, a singlet at $\delta = 1.09$ and a triplet at $\delta = 0.65$.

Example 8. Product obtained as a clear, orange-yellow solution in THF. Dry product was an orange-yellow solid. PMR analysis of a 0.2 M solution in THF at −6° C. showed a doublet at $\delta = 6.48$, a doublet at $\delta = 6.18$, a singlet at $\delta = 1.07$ and a triplet at $\delta = 0.65$. IR absorption at 1590 (s), 1272 (m), 1225 (m), 1185 (s), 1034 (m), 811 (m), 640 (w) and 555 (m) cm$^{-1}$.

Example 9. Product obtained as a yellow-orange solution in THF. Dry product was a yellow-orange solid. PMR analysis of a 0.15 M solution in THF at −6° C. showed a doublet at $\delta = 6.54$, a doublet at $\delta = 5.86$, a singlet at $\delta = 1.06$ and a singlet at $\delta = 0.67$. IR absorption at 1595 (s), 1495 (m), 1272 (m), 1186 (s), 1040 (m), 812 (m), 643 (w) and 557 (m) cm$^{-1}$.

Example 10. Product obtained as a clear, orange solution in THF. Dry product was a pale yellow-orange solid. PMR analysis of a 0.5 M solution in THF at 30° C. showed a singlet at $\delta = 5.76$. IR absorption at 3055 (w), 1030 (s), 1009 (s), 877 (m), 794 (m), 772 (vs) and 740 (vs) cm$^{-1}$.

Example 11. Product precipitated from the reaction mixture as a white solid. IR absorption at 3060 (w), 1034 (s), 1007 (s), 878 (m), 783 (m), 700 (vs) and 733 (vs) cm$^{-1}$.

Example 12. Product obtained as a clear, orange solution in THF. Dry product was an orange solid. λ(max) at 334 mμ. PMR analysis of a 0.4 M solution in THF at 30° C. showed a quartet at δ = 7.37, a quartet at δ=6.68, a triplet at δ=6.29 and a doublet at δ = 5.80. IR absorption at 1322 (m), 1254 (w), 1216 (w), 1038 (m), 1024 (s), 874 (m), 861 (m), 745 (vs) and 437 (m) cm$^{-1}$.

Example 13. Product obtained as a clear, orange solution in THF. Dry product was a light yellow-orange solid. PMR analysis of a 0.2 M solution in THF at 30° C. showed a quartet at δ = 7.31, a quartet at δ = 6.60, a triplet at δ = 6.40 and a doublet at δ = 5.87. IR absorption at 1322 (m), 1250 (w), 1224 (m), 1028 (m), 870 (w) and 750 (s) cm$^{-1}$.

Example 14. Product obtained as a clear, pale yellow solution in THF. Dry product was a pale yellow solid. IR absorption at 3035 (w), 2020 (m), 1595 (m), 1192 (m), 1180 (m), 1068 (m), 1023 (m), 910 (m), 750 (s), 675 (s), 532 (s) and 485 (s) cm$^{-1}$.

Example 15. Product was partially soluble in THF and was obtained as a clear, amber-colored solution in THF and as a gray-white precipitate. IR absorption at 3035 (w), 2020 (w), 1595 (m), 1186 (m), 1173 (m), 1068 (m), 1037 (m), 1023 (m), 910 (m), 754 (vs), 692 (vs), 540 (m), and 485 (m) cm$^{-1}$.

Example 16. Product obtained as a dark amber solution in THF. Dry product was amber solid. IR absorption at 3045 (w), 2010 (w), 1590 (m), 1182 (m), 1170 (m), 1062 (m), 1030 (m), 1018 (m), 904 (m), 749 (vs), 687 (vs), 539 (s) and 483 (s) cm$^{-1}$.

Example 17. Product was partially soluble in THF and was obtained as a clear, orange solution in THF and as a red oil. PMR analysis of about a 0.05 M solution in THF at 30° C. showed a quartet at δ = 5.96, a doublet at δ = 5.40 and a doublet at δ = 5.10.

Example 18. Product obtained as a clear, orange solution in THF. PMR analysis of a 0.6 M solution in THF at 30° C. showed multiplets at δ = 8.00 and 6.89. At 23° C., the product slowly reacted with THF.

Example 19. Product was partially soluble in THF and was obtained as a dark orange solution in THF and as an orange precipitate. PMR analysis of a 0.1 M solution in THF at 4° C. showed multiplets at δ = 7.96 and δ = 6.89. IR absorption at 3020 (w), 1595 (m), 1400 (m), 1200 (s), 1037 (s), 972 (s), 880 (m), 698 (s) and 609 (m) cm$^{-1}$. By-products were benzene and ethylene. Higher product yields are obtained by using a lower reaction temperature, e.g. 0° C. throughout the reaction.

Example 20. Product obtained as a dark orange solution in THF which yielded pale yellow crystals upon cooling to ca. −70° C. PMR analysis of a 0.4 M solution in THF at 4° C. showed a doublet at δ = 7.93, a triplet at δ = 6.99 and a triplet at δ = 6.77. IR absorption at 3020 (w), 1550 (m), 1410 (w), 1212 (m), 1037 (s), 963 (m), 880 (m), 700 (s) and 605 (m) cm$^{-1}$.

EXAMPLE 21

Preparation of Dimethylcalcium

Using substantially the same equipment and procedure set forth in Example 1, dimethylmercury (0.25 ml., 3.3 mmoles) was reacted with calcium chips (molar excess) in 7 ml. of dry, freshly distilled THF at 0° C for 3 hrs. with stirring. The mixture was centrifuged and the supernatant liquid (21 a) separated from the solid residue (21 b). The supernatant liquid, (21 a), contained product and unreacted dimethylmercury; hence, it was stirred in the presence of more fresh calcium chips at 0° C. for about 2 hours, the mixture centrifuged and the supernatant liquid (21 c) separated and maintained. The solid residue (21 b) contained dimethylcalcium, mercury and excess calcium. The desired product was extracted from (21 b) by stirring same in the presence of 4.0 ml. of THF at 0° C., centrifuging the mixture and recovering the supernatant liquid, (21 d). The combined supernatant liquids, (21 c) and (21 d), were determined to be a solution of dimethylcalcium in THF. The solution was essentially free of by-products. Product obtained in 96 percent yield, based on mercury reactant. Dry product was a white solid which was not readily soluble in THF, 1,2-dimethoxyethane or N,N,N',N'-tetramethylethylenediamine. The dry solid, as well as dimethylcalcium solutions in THF, reacted rapidly with anhydrous pyridine at ambient temperatures. PMR analysis of a 0.2 M product solution in THF at 30° C. showed broad bands in the region of from δ = −1.2 to δ = −1.8 ppm. The PMR spectrum was dependent on both concentration and temperature. The reaction rate is increased by using finely divided particles of calcium.

EXAMPLE 22

Preparation of Diethylcalcium

Using substantially the same equipment and procedure set forth in Example 1, diethylmercury (0.35 ml., 3.3 mmoles) was reacted with calcium chips (molar excess) in 6 ml. of dry, freshly distilled diethyl ether at −10° C. for 6 hours with stirring. Desired product was partially soluble in the ether. The volatiles were stripped from the isolated supernatant liquid leaving a white solid residue (22 a) of product. The remainder of the product was not recovered from the reaction mixture, but could easily have been by solvent extraction. The residue, (22 a), was essentially free of by-products, i.e. 95 percent purity or above. PMR analysis of a 0.3 M solution in THF at temperatures below about −20° C. showed resonance bands between from δ = −0.4 and δ = −1.3 ppm, and in the region of δ = 1.28 ppm. At temperatures above about −20° C., the THF solution was unstable.

EXAMPLE 23

Preparation of Diethylstrontium

Using substantially the same equipment and procedure set forth in Example 1, diethylmercury (0.30 ml., 2.8 mmoles) was reacted with finely divided strontium in 5 ml. of THF for 15 minutes at −10° C. and for 2 hours at −35° C. with stirring. Product obtained as a clear, dark yellow solution in THF (solution unstable above about −30° C.). Product was essentially free of by-products and obtained in 95 percent yield, based on 90 percent conversion of mercury reactant. PMR analysis of a 0.15 M solution in THF at −65° C. showed broad resonance absorption between δ = −0.4 and δ = −1.4 ppm, and in the region of δ = 1.24 ppm.

Styrene was polymerized by adding 0.042 ml. of a 0.6 M solution of bis(benzyl)calcium in THF (0.025 mmoles) to a stirred mixture of styrene monomer (8.7 mmoles) and 9.0 ml. of THF at 23° C. in a suitable reaction vessel. The reaction was exothermic and quite rapid. After 10 minutes of reaction time, the reaction was quenched by adding methanol to the reaction mixture. The polystyrene was precipitated from the mixture by pouring same into methanol acidified with 0.1 N HCl. The polystyrene was separated from the mixture by filtration, dried under vacuum and weighed; it weighed 0.91 gm. which represents 100 percent yield.

In like manner, styrene was polymerized in other runs. The results are summarized in Table II; the initiator was a THF solution of bis(allyl)calcium in runs 1 and 2 and was bis(benzyl)calcium in runs 3–6; reaction time of 10 minutes at 23° C.

TABLE II

| Run No. | M/I Ratio | Percent Yield | $\bar{M}w$ | n | $\bar{M}w/\bar{M}n$ |
|---|---|---|---|---|---|
| 1 | ca. 70 | 93 | 63,900 | 38,500 | 1.66 |
| 2 | 230 | 69 | 91,300 | 48,700 | 1.87 |
| 3 | 78 | 100 | 41,200 | 23,800 | 1.73 |
| 4 | 348 | 100 | 78,500 | 56,100 | 1.39 |
| 5 | 970 | 100 | 126,900 | 78,800 | 1.61 |
| 6 | 1,450 | 83 | 172,300 | 112,800 | 1.52 |

M/I Ratio is the molar ratio of monomer to initiator. Percent yield is based on monomer. $\bar{M}w$ and $\bar{M}n$ represent the weight average molecular weight and number average molecular weight, respectively, as determined by gel phase chromatography. The polystyrenes produced above may be molded or extruded into many useful articles or in lacquer formulations. Lower molecular weight polymers are produced by replacing a portion of the THF with an aromatic hydrocarbon solvent, such as benzene.

In like manner, isoprene monomer was polymerized to form useful polymers. The results are summarized in Table III; the initiators were essentially THF-free suspensions in hydrocarbon media, i.e. bis(benzyl)strontium in toluene for runs 1 and 2 and an equimolar mixture of bis(benzyl)calcium and bis(benzyl)barium in benzene for run 3; reaction conditions of 21 hours at 60° C. for runs 1 and 2 and 20 hours at 50° C. for run 3.

TABLE III

Polyisoprene Microstructure

| Run No. | M/I Ratio | Percent Yield | Percent Cis-1,4 | Percent Trans-1,4 | Percent 3,4 |
|---|---|---|---|---|---|
| 1 | 190 | 76 | 24 | 56 | 20 |
| 2 | 380 | 91 | 25 | 55 | 20 |
| 3 | 400 | 31 | 51 | 32 | 17 |

In a similar manner, a stirred mixture of styrene (7.9 g.) and butadiene (4.8 g.) in cyclohexane (ca. 100 ml.) was copolymerized by warming the mixture at 45°–50° C. for 5 days in the presence of 0.45 ml. of a 0.13 M solution of bis(benzyl)calcium in THF; M/I ratio of ca. 2800. Product yield, 100 percent of theory. IR shows the weight ratio of styrene/butadiene to be ca. 58/42, and polybutadiene microstructure to be 80 percent trans-1,4, 14 percent cis-1,4 and 6 percent 1,2-vinyl content.

In another experiment, styrene (6.4 g.) was sequentially polymerized with butadiene (4.2 g.) by stirring styrene in cyclohexane (ca. 90 ml.) at ambient temperature for 20 hours in the presence of 0.18 ml. of a 0.12 M solution of bis(benzyl)calcium in THF followed by addition of butadiene and continued stirring at ambient temperature for 50 hours. Product yield, 100 percent of theory. IR shows the weight ratio of styrene/butadiene to be ca. 52/48, and polybutadiene microstructure to be 84 percent of trans-1,4, 10 percent cis-1,4 and 6 percent 1,2-vinyl content.

Other bisorganoalkaline earth metal compounds described herein, and mixtures thereof, can likewise be used as catalysts for the homo- and co-polymerization of vinyl monomers. The compounds are used in small but initiating amounts, e.g. from about $10^{-5}$ mole up to 1 mole of initiator per mole of monomer. Typical temperatures for the polymerization range from about −78° C. to about 200° C. for periods of from about 1 minute to about 1,000 hours. Pressure is not critical; however, superatmospheric pressure may be advantageous in some instances. Likewise, substantially anhydrous, inert conditions are advantageous. Examples of suitable vinyl monomers include: styrene; lower alkyl- or alkoxy-substituted styrenes, by lower alkyl- and alkoxy- is meant groups of from one to four carbon atoms, such as methyl, ethyl, t-butyl, ethoxy, butoxy, and the like; divinylbenzene; lower alkyl acrylates and methacrylates, such as methyl, ethyl, propyl and butyl acrylate and methacrylate; isoprene; butadiene, and the like.

The subject compounds are also useful as metallating reagents in reactions illustrated by the equation: R—M—R + 2R'—H → R'—M—R' + 2R—H, wherein R—M—R is as defined above and R' is a hydrocarbon radical. The pKa of R—H must be greater than the pKa of R'—H for the reaction to proceed to completion. E.g. dimethylcalcium, diethylcalcium, diphenylcalcium, diphenylstrontium, diphenylbarium, diallylcalcium, diallylstrontium, diallylbarium, dibenzylcalcium, dibenzylstrontium, dibenzylbarium, bis(p-t-amyl-benzyl)calcium, bis(p-t-amyl-benzyl)strontium and bis(p-t-amylbenzyl)barium each reacted with indene in THF at temperatures below the decomposition temperature of the R—M—R reagent to product the corresponding bis(indenyl)alkaline earth metal in essentially 100 percent yield. Other hydrocarbons can be used in place of indene and other R—M—R compounds can be used to give similar results.

We claim:

1. A process for preparing in substantially pure form a compound corresponding to the formula R—M—R, wherein M is calcium, strontium or barium, and R is a hydrocarbyl or hydrocarbyloxy-substituted hydrocarbyl radical having a total carbon content of from one to 25 carbon atoms; said process comprising the steps of:
   1. reacting by contacting, in an essentially anhydrous inert atmosphere, a solution of a bisorganomercury compound corresponding to the formula R—Hg—R, wherein R has the aforesaid meaning, with at least an equimolar amount of metallic calcium, strontium or barium; and
   2. separating the liquid phase containing the product from precipitated mercury and residual metallic calcium, strontium or barium.

2. The process defined in claim 1 wherein M is calcium.

3. The process defined in claim 1 wherein M is strontium.

4. The process defined in claim 1 wherein M is barium.

5. The process defined in claim 1 wherein each R is the same.

6. The process defined in claim 5 wherein R is an alkyl, aryl, alkaryl, aralkyl, alkenyl, cycloalkenyl, cycloalkyl, or aralkynyl group of from one to 10 carbon atoms.

7. The process defined in claim 6 wherein R is alkyl of from one to four carbon atoms, phenyl, benzyl, p-t-amylbenzyl, vinyl, allyl, cyclopropyl, cyclohexenyl, indenyl or phenylethynyl.

8. The process defined in claim 1 wherein the reaction solvent is a liquid, aliphatic or cycloaliphatic ether or polyether.

9. The process defined in claim 8 wherein said solvent is tetrahydrofuran.

10. The process defined in claim 1 wherein the reaction temperature is from about −70°C. to about 70°C.

11. The process defined in claim 1 wherein the reaction temperature is from about −10°C. to about 30°C.

12. A substantially pure bisorganoalkaline earth compound corresponding to the formula R—M—R, wherein M is calcium, strontium or barium, and R is an alkyl, aryl, alkaryl, aralkyl, alkenyl, cycloalkyl, cycloalkenyl, or alkoxy- or aryloxy-substituted alkyl, aryl, alkaryl, aralkyl, alkenyl, cycloalkyl or cycloalkenyl group having a total carbon content of from one to 25 carbon atoms; the conjugate acid (R—H) of said compound having a pKa greater than triphenylmethane.

13. The compound defined in claim 12 wherein the R groups are the same, and R is an alkyl, aryl, alkaryl, aralkyl, alkenyl, cycloalkyl or cycloalkenyl group of from one to 10 carbon atoms.

14. The compound defined in claim 13 wherein R is alkyl of from one to four carbon atoms, phenyl, benzyl, p-t-amylbenzyl, vinyl, allyl, cyclopropyl, cyclohexenyl.

15. The compound defined in claim 14 wherein R is methyl or ethyl.

16. The compound defined in claim 14 wherein R is phenyl.

17. The compound defined in claim 14 wherein R is benzyl.

18. The compound defined in claim 14 wherein R is p-t-amylbenzyl.

19. The compound defined in claim 14 wherein R is allyl.

20. The compound defined in claim 12 wherein M is calcium.

21. The compound defined in claim 12 wherein M is strontium.

22. The compound defined in claim 12 wherein M is barium.

23. The process defined in claim 1 wherein R is a hydrocarbyl radical of from one to 25 carbon atoms.

* * * * *